United States Patent [19]
Paulson et al.

[11] 4,135,722
[45] Jan. 23, 1979

[54] RECORD-CUTTING SYSTEM

[75] Inventors: Rollie W. Paulson, 349 Cummings, NW., Grand Rapids, Mich. 49504; Glenn B. Morse, Grand Rapids, Mich.

[73] Assignee: Rollie W. Paulson, Grand Rapids, Mich.

[21] Appl. No.: 827,938

[22] Filed: Aug. 26, 1977

[51] Int. Cl.² .............................................. G11B 3/38
[52] U.S. Cl. ................................ 274/23 A; 274/46 R
[58] Field of Search ................. 274/13 R, 23 A, 46 A

[56] References Cited

U.S. PATENT DOCUMENTS

| | | | |
|---|---|---|---|
| 1,278,042 | 9/1918 | Sholman | 274/13 R |
| 2,061,224 | 11/1936 | Democratis | 274/13 R |

FOREIGN PATENT DOCUMENTS

| | | | |
|---|---|---|---|
| 641413 | 1/1937 | Fed. Rep. of Germany | 274/13 R |
| 394492 | 11/1907 | Fed. Rep. of Germany | 274/13 R |

Primary Examiner—Charles E. Phillips
Attorney, Agent, or Firm—Glenn B. Morse

[57] ABSTRACT

A cutting transducer is mounted on a radius arm positioned in the same relationship with a turntable as is conventional for the tone arm of a record player. Crossfeed is established by a screw having an axis substantially radial with respect to the axis of the turntable. A nut engaging the screw is mounted on a carrier slidably engaging the radius arm. The drive system is movable vertically and laterally to accommodate the placement and removal of blanks on the turntable.

5 Claims, 5 Drawing Figures

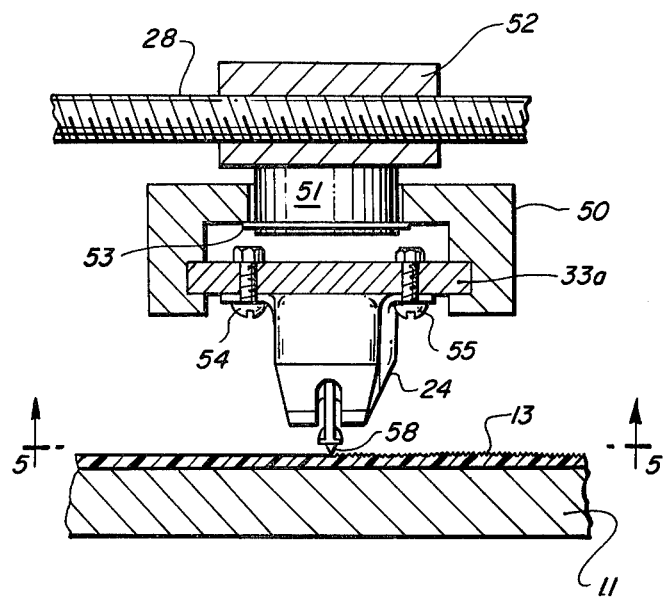
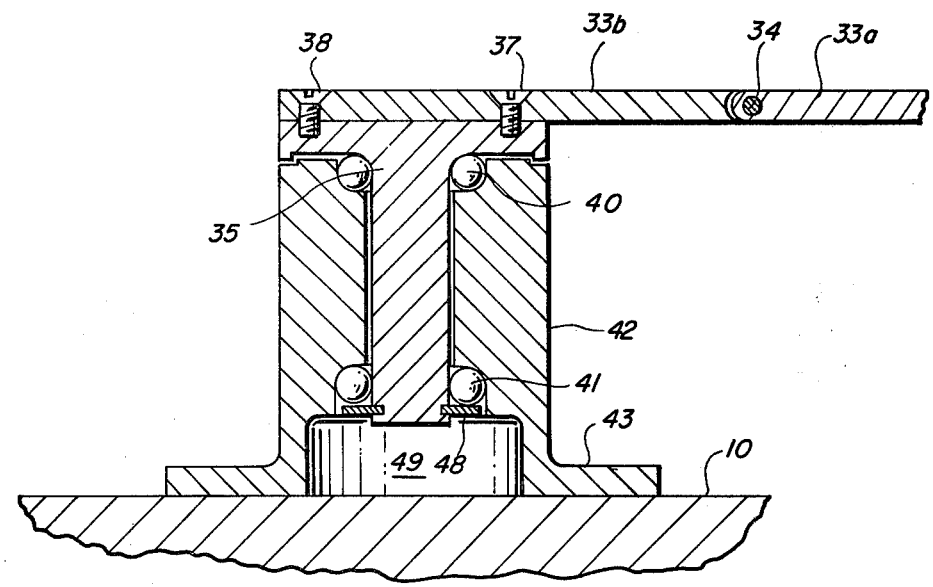
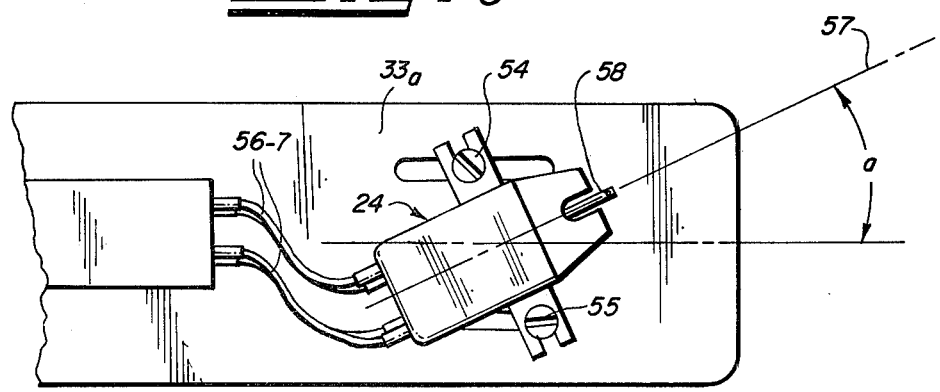

RECORD-CUTTING SYSTEM

BACKGROUND OF THE INVENTION

The masters of phonograph records are normally cut by the action of a transducer that converts the incoming electronic signals (derived from a microphone and amplifier system) to a lateral and/or vertical wave movement of a needle adapted to cut the record groove. A cross-feed system for establishing the groove spiral is usually based upon a screw arranged substantially radially with respect to the turntable, and carrying a nut associated with the structure supporting the transducer. The following patents have been noted as typical of the line of development of this type of system:

| PATENT NUMBER | INVENTOR | DATE OF ISSUE |
|---|---|---|
| 1,218,625 | Brown | 1917 |
| 1,278,042 | Shulman | 1918 |
| 1,389,430 | Gilman | 1921 |
| 1,645,911 | Kramer | 1927 |
| 1,827,519 | Hansen | 1931 |
| 1,860,104 | Larsen | 1932 |
| 2,061,224 | Democratis | 1936 |
| 2,262,299 | Rebold | 1941 |
| 2,375,658 | Johnson | 1945 |
| 2,858,135 | Sherwood | 1958 |

Most record players of modest cost mount the pickup transducer on a radius arm commonly referred to as a "tone arm," primarily because of the simplicity of this arrangement. Any discrepancy between the orientation and movement of the cutting transducer from that of the playback transducer produces a tendency toward a distortion of the sound emerging from the record player system. Most record-cutting machinery in commercial use provides a straight radial movement of the record-cutting transducer with respect to the axis of the turntable on which the blank is mounted. Obviously, this produces a considerable difference between the orientation and path of movement between the cutting and playback transducers. The radius arm of the playback unit produces an arcuate path, and a progressively changing angle between the tone arm and a tangent to the record groove at any time. The lateral oscillation axis of the playback transducer also varies with respect to a tangent to the record groove, for the same reason. The result of all this is that the playback needle is controlled by groove oscillations that have different reference axes from those with which the grooves were created.

SUMMARY OF THE INVENTION

The spiral path of the needle of a cutting transducer is controlled by a feed screw rotating on an axis generally radial with respect to the axis of the turntable. A nut in threaded engagement with the screw is mounted on a carriage slideably received on a radius arm having its pivotal support in a geometrically similar relationship to the pivot axis and turntable axis of a conventional record player. The oscillation axis of the cutting transducer is established by the mounting of the transducer on the radius arm in a similar angular relationship to that of the conventional playback transducer to its tone arm. The drive mechanism, and the associated parts of the radius arm of the record-cutting system, are vertically movable to accommodate placement and removal of record blanks on the turntable, and is preferably capable of a lateral swinging movement sufficient to provide greater clearance. The vertical position of the cutting transducer during its normal operation is controlled by an adjustable component on the support structure.

DESCRIPTION OF THE DRAWINGS

FIG. 3 is a section on an enlarged scale on the plane 3—3 of FIG. 1.

FIG. 4 is a sectional elevation of the plane 4—4 of FIG. 1.

FIG. 5 is a view on the plane 5—5 of FIG. 3, showing the radius arm and transducer separately from the carriage and adjacent structure.

DESCRIPTION OF THE PREFERRED EMBODIMENTS

Figure 1:
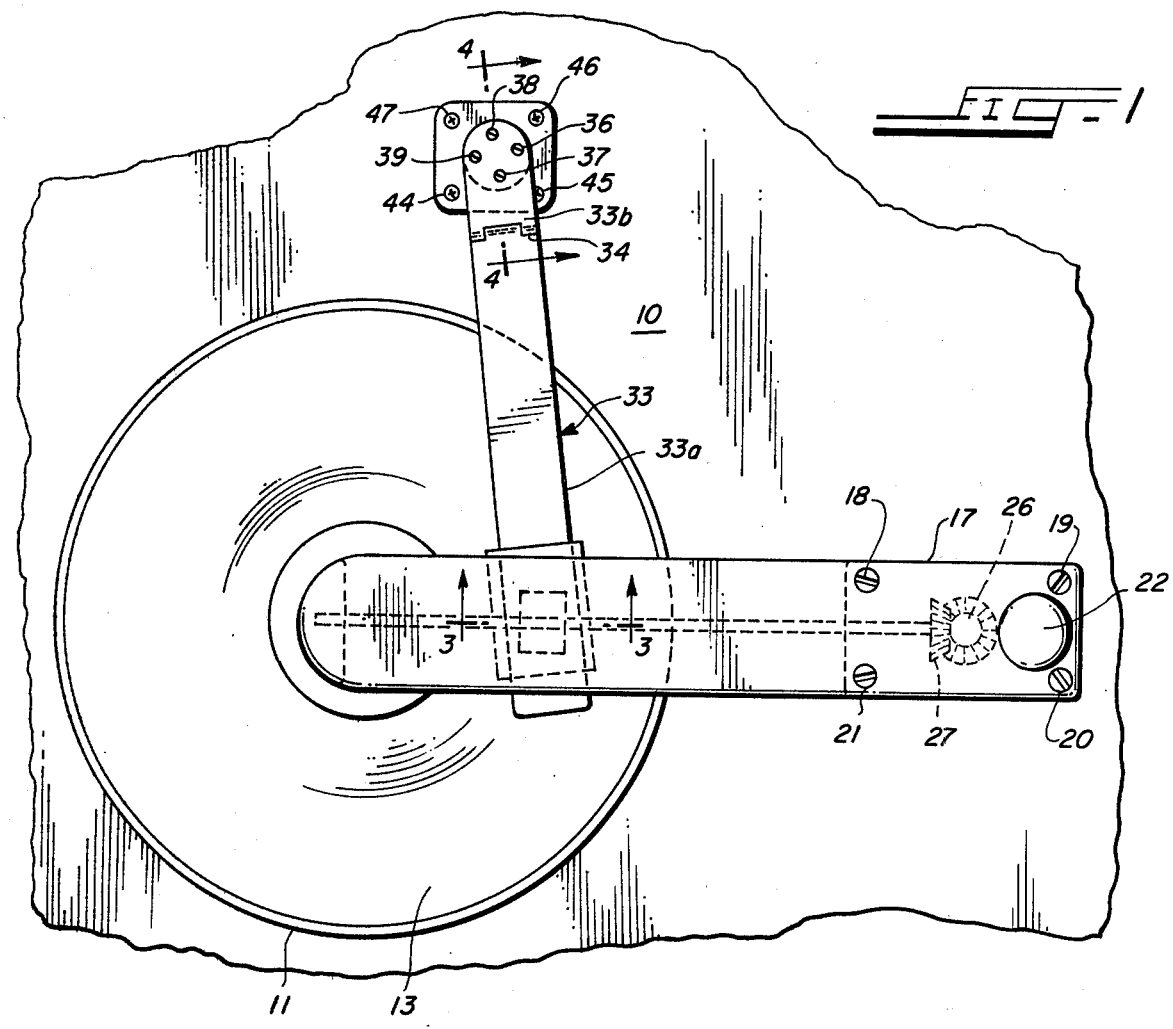
FIG. 1 is a plan view of the record-cutting system incorporating the present invention.

Referring to the drawings, the illustrated record-cutting machine has a base structure providing a table-like top surface 10. This surface is traversed by the shaft of the turntable 11, the shaft terminating in a centering projection 12 for the alignment of a record blank 13 in proper concentric relationship. The short guide rod 14 and longer guide rod 15 are fixed with respect to the base structure, and extend vertically from the top surface 10. The lower drive housing component 16 and the upper component 17 constitute a support frame, and are slideably received on the rods 14 and 15, and are secured together by screws at 18–21 in FIG. 1. The cap 22 is in threaded engagement with the extension 23 on the housing component 17 for abutment with the top of the guide rod 15 for the establishment of the operating position (vertically) of the drive system and the cutting transducer 24 positioned with the drive assembly. The shaft 25 moves vertically with the drive housing component 16, and has a conventional spline connection (not shown) with the drive mechanism associated with the turntable 11.

Figure 2:
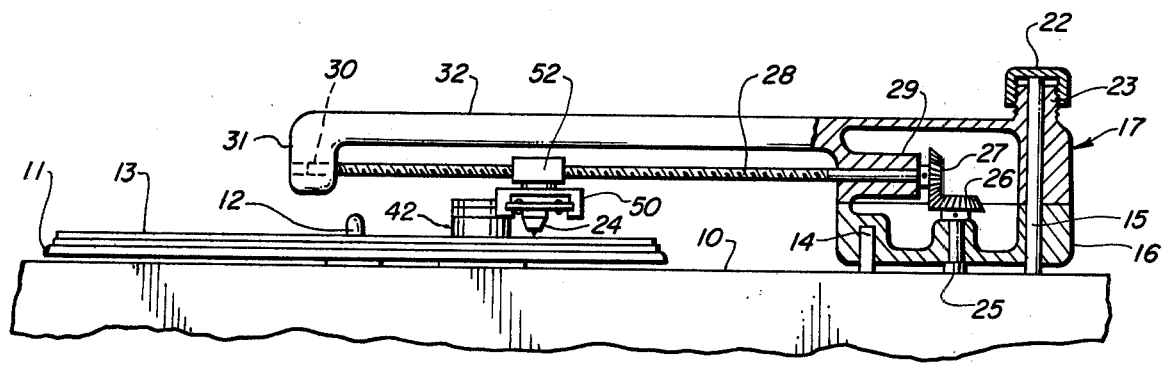
FIG. 2 is a sectional elevation, partially in section, with respect to FIG. 1.

The shaft 25 drives the bevelled gear 26 in mesh with the bevelled gear 27 secured to the screw 28 rotatably received in the upper housing section 17 in the integral bearing portion 29. The portion of the screw shaft 28 received within this bearing portion is preferably slightly less in diameter than that of the threaded portion beyond the bearing, so that this diameter change, together with the presence of the hub of the bevelled gear 27, determines the axial position of the screw. The opposite end 30 of the screw shaft is received in a bearing bore in the depending end 31 of the over arm 32, the diameter of the end 30 preferably being equal to or slightly larger than the diameter of the central threaded portion of the shaft so that the shaft can be assembled from the left, as shown in FIG. 2, into engagement with the bearing portions of the structure.

The radius arm 33 is divided into two sections 33a and 33b hinged on a horizontal axis at 34 to provide for articulation caused by the elevation of the radially outer extremity of the section 33a. The radius arm section 33b is secured to the top of the turret 35 by screws as shown at 36–39. This turret is rotatably supported by the bearings 40 and 41 in the pedestal 42 provided with the base flange 43, which is secured to the surface 10 with screws as shown at 44–47. The turret is retained in engagement with the pedestal 42 by a snap ring 48 assembled through the recess 49 in the pedestal 42.

Referring particularly to FIGS. 3 and 5, the carriage 50 slideably supports the opposite edges of the radius arm section 33a, and is itself supported for rotation on a vertical axis by the cylindrical downward extension 51 of the nut 52 in threaded engagement with the feed screw 28. The snap ring 53 retains the assembled relationship of these components. The conventional transducer 24 is secured to the underside of the radius arm section 33a by screws as shown at 54 and 55. Conventional electrical leads as shown at 56 and 57 associate the transducer with the electronic system of the machine. This portion of the assembly is conventional. The cutting transducer 24 is mounted in an angular relationship with the radius arm such that the reference axis 57 about which the cutting stylus 58 oscillates is disposed at an angle to the radius arm axis of approximately twenty-five degrees indicated at "a" in FIG. 5.

Insertion and removal of a blank 13 obviously requires movement of the transducer to a position of clearance, which is accommodated by the slideable mounting of the drive housing 17 on the guide rods 14 and 15. This vertical movement can continue to the point of the disengagement of the housing from the short guide rod 14, which should be at approximately the same height at the disengagement of the spline connection of the shaft 25. In such a position, the entire housing can be rotated out of a position over the top of the turntable 11, with or without disengagement of the carriage 50 from the radius arm section 33a.

We claim:

1. A record-cutting machine including a base structure, a turntable rotatably mounted on said base structure, a radius arm pivotally mounted on said base structure, a transducer mounted on said radius arm and having a stylus providing oscillations in a characteristic direction, and cross-feed means establishing a controlled movement of said radius arm across and above said turntable for cutting a spiral groove in a record blank mounted on said turntable, wherein the improvement comprises:

a support frame mounted on said base structure and a feed screw rotatably mounted in said support frame on an axis extending across and above said turntable, and a nut in threaded engagement with said feed screw, together constituting a part of said cross-feed means;

a member slideably mounted on said radius arm and pivotally connected to said nut, said transducer being mounted on said radius arm in a clearance position with respect to said slideable member, and disposed so that said characteristic direction of the oscillations of said stylus is oriented at an angle of approximately twenty-five degrees to the longitudinal axis of said radius arm, said transducer being mounted on the underside of said radius arm, and said slide member embracing the top and opposite edges of said radius arm exclusively; and drive means for said feed screw.

2. A record-cutting machine including a base structure, a turntable rotatably mounted on said base structure, a radius arm pivotally mounted on said base structure, a transducer mounted on said radius arm and having a stylus providing oscillations in a characteristic direction, and cross-feed means establishing a controlled movement of said radius arm across and above said turntable for cutting a spiral groove in a record blank mounted on said turntable, wherein the improvement comprises:

a support frame mounted on said base structure and a feed screw rotatably mounted in said support frame on an axis extending across and above said turntable, and a nut in threaded engagement with said feed screw, together constituting a part of said cross-feed means, said cross-feed means further including an angle drive assembly mounted in said support frame, and said support frame is vertically moveable on guide means secured to said base structure, said radius arm being vertically moveable with said support frame;

a member slideably mounted on said radius arm and pivotally connected to said nut, said transducer being mounted on said radius arm in a clearance position with respect to said slideable member, and disposed so that said characteristic direction of the oscillations of said stylus is oriented at an angle of approximately twenty-five degrees to the longitudinal axis of said radius arm; and drive means for said feed screw.

3. A machine as defined in claim 2, wherein said support frame is slideably mounted on vertical guide rods, and said drive means includes an axially disengageable vertical shaft normally rotatively associated with said turntable.

4. A machine as defined in claim 3, additionally including a member adjustably secured to said support frame and disposed to bear on the end of one of said guide rods.

5. A machine as defined in claim 4, wherein one of said rods is substantially longer than the others to provide a pivotal connection providing freedom of said support frame to rotate out of a position over said turntable.

* * * * *